United States Patent [19]

Polimeni et al.

[11] Patent Number: 5,874,966
[45] Date of Patent: Feb. 23, 1999

[54] CUSTOMIZABLE GRAPHICAL USER INTERFACE THAT AUTOMATICALLY IDENTIFIES MAJOR OBJECTS IN A USER-SELECTED DIGITIZED COLOR IMAGE AND PERMITS DATA TO BE ASSOCIATED WITH THE MAJOR OBJECTS

[75] Inventors: Joseph C. Polimeni, Austin; James L. Taylor, Granger, both of Tex.

[73] Assignee: International Business Machines Corporation, Armonk, N.Y.

[21] Appl. No.: 550,428

[22] Filed: Oct. 30, 1995

[51] Int. Cl.[6] ..................................................... G06T 11/40
[52] U.S. Cl. ........................ 345/431; 345/349; 345/351; 345/441
[58] Field of Search .................................... 395/351, 349; 382/181, 199; 345/431, 349, 351, 441

[56] References Cited

U.S. PATENT DOCUMENTS

| | | | |
|---|---|---|---|
| 4,601,003 | 7/1986 | Yoneyama et al. | 364/518 |
| 5,034,901 | 7/1991 | Kuwata et al. | 364/518 |
| 5,310,349 | 5/1994 | Daniels et al. | 434/350 |
| 5,347,628 | 9/1994 | Brewer et al. | 395/159 |
| 5,349,658 | 9/1994 | O'Rourke et al. | 395/700 |
| 5,491,783 | 2/1996 | Douglas et al. | 395/159 |
| 5,721,851 | 2/1998 | Cline et al. | 395/349 |

OTHER PUBLICATIONS

Finnie, "What Microsoft left out of Windows 95 (Microsoft Windows 95 Plus Pack disk/file management software," PC/Computing, Sep. 1995, v. 8, N. 9, p.88(1).
Wilson, "Map This?"Freeware image editor, available before Sep. 19. 1995.
Internet Update, Newsbytes News Network, Jul. 19, 1995.
Kornefores, et al., "Hyperbook Tools, and Authoring Tool", Multi–media Engineering Education, IEEE, 1994, pp.281–286.
Woolsey, "Multimadia Scouting ", IEEE Computer Graphics & Applications, 1991. pp. 26–37.
Clarisse, et al, "An Icon Manager in LISP", 1985 IEEE Workshop on Languages for Automation, pp. 116–131.
Tonomura, et al, "Content Orient ed Visual Interface Using Video Icons for Visual Database Systems", 1989 Worksop on Visual Languages, IEEE, 1989, pp. 68–73.
Kimura et al., "Form/Formula, A Visual Programming Paradigm . . . ", IEEE Computer, Mar. 1995.
Lin et al., "Color Image Segmentation . . . ", Proceedings of the 1991 IEEE, Apr. 1991.
Gauch et al., "A Comparison of Three Color . . . ", SPIE Vol. 1818 Visual Comm. and Image Processing '92.
Clarkson, "An Easier Interface", BYTE, Feb. 1991.
Sheldon et al., "Window Wars", BYTE, Jun. 1991.
Grimson et al., "Computer Vision Applications", Communication Of The ACM, vol. 37, No. 3, Mar. 1994.
Kaushal, "Visibly Bedder Edge–Detection . . . ", Pattern Recognition Ltrs. 15 (1994).
Callahan, "Excessive Realism in GUI Design . . . ", Software Dev., Sep. 1994.

(List continued on next page.)

*Primary Examiner*—Rudolph J. Buchel, Jr.
*Attorney, Agent, or Firm*—Mark S. Walker; Brian F. Russell; Andrew J. Dillon

[57] ABSTRACT

A data processing system graphical user interface that is customizable to any user-selected color bitmap image is provided. According to the present invention, a user-selected color bitmap image containing a plurality of major objects is imported into the data processing system and set as a scene for the data processing system's graphical user interface. Major objects in the scene are then automatically identified, wherein a major object is one having a plurality of pixels of a selected characteristic. An identified major object is then selected and associated with a set of data, such that when the major object is subsequently selected, a particular data processing system operation is automatically performed utilizing the associated data set.

36 Claims, 7 Drawing Sheets

OTHER PUBLICATIONS

Ehrenman, "But What About Bob?", PC Magazine, Apr. 25, 1995.

Leu et al., "A Growing Process . . . ", SPIE vol. 2238.

Liyuan et al., "An Active Edge Detection Approach", IEEE Tencon '93.

Liu et al., "Mutliresolution Color Image . . . ", IEEE Transactions On Pattern Analysis, vol. 16, No. 7, Jul. 1994.

Pries et al., "On Hierarchical Color . . . ", 1993, IEEE, pp. 633–634.

Proceedings–IEEE Workshop on Visualization and Machine Vision, Jun. 1994.

Shigenaga, Akira, Image Segmentation Using Color and Spatial–Frequency Representations.

Jiang et al., "Comparative Performance Evaluation . . . ", Systems and Computers in Japan, vol. 24, No. 13, 1993.

Cheng et al., "Color Images Segmentation . . . ", SPIE vol. 1607, Intelligent Robots and Computer Vision X: Algorithms and Techniques (1991).

Eggleston, "Object Segmentation Techniques . . . ", Amerinex Artifical Intelligence, Inc.

Hedley et al., "Segmentation of Color Images . . . ", Journal of Electronic Imaging, Oct. 1992.

Martino et al., "Image Segmentation By Non Supervised . . . ", SPIE vol. 2182, (1994).

Novak et al., "Anatomy of a Color Histogram", IEEE 1992.

Etemad et al., "A Neural Network Based On Edge Detector", 1993 IEEE International Conf. on Neutral Networks.

Chao et al., "Edge Detection Using a Hopfield . . . ", Optical Engineering, Nov. 1994.

Srinivasan et al.,"Edge Detection Using . . . ", Pattern Recognition, vol. 27, No. 12, 1994.

Schmeelk, "Convolutions, Transforms and Edge . . . " 1994 Tempus Publications.

CUSTOMIZABLE GRAPHICAL USER INTERFACE THAT AUTOMATICALLY IDENTIFIES MAJOR OBJECTS IN A USER-SELECTED DIGITIZED COLOR IMAGE AND PERMITS DATA TO BE ASSOCIATED WITH THE MAJOR OBJECTS

BACKGROUND OF THE INVENTION

1. Technical Field

The present invention relates in general to a graphical user interface in a data processing system, and in particular to a graphical user interface in a data processing system that allows user selection of the interface image. Still more particularly, the present invention relates to a graphical user interface in a data processing system that is customizable to any arbitrary user selected color bit map image.

2. Description of the Related Art

The user interface for a personal computer defines how the user communicates with the computer. This communication link defines how applications are used, how tasks are switched, and how choices are made. Years ago, computers were used, almost exclusively, by highly skilled professionals for very specific engineering, scientific, or business tasks. The user interface was not intuitive, and frequently required special training. The extra training was acceptable since the applications were so crucial to these professions. Today, computer applications are used by all segments of the population. Thus, easier and more intuitive user interfaces have been necessary to reduce the specialized training required to operate computers.

Most first time users of computers are not as familiar with keyboards as they are familiar looking at pictures, pointing to objects, grabbing and moving household items. Thus, to really capture the creative powers of users, and to enable even children to use the computer, graphical user interfaces (GUI) were developed. By using a mouse to point to objects on a display, represented by small images (icons), a user could control the computer without knowing any complex commands. The mouse controlled graphical interface allowed the user to point to icons representing programs and group those icons into window frames.

Teaching new computer users how to use the computer to accomplish tasks that used to be performed at a desk with paper and pen is made easier with the use of a "Desktop" metaphor for a GUI. The metaphor helps bridge users from the past methods to the computer. The Desktop display works quite well for the business and personal uses of a computer which assisted tasks that were traditionally performed on the desktop.

The current trend in GUIs is to use a "home" metaphor, with pictures of desks, paper, books, files, rooms and thereby allowing home users to be more comfortable and productive with the computer. One of the first entries into this market was "The Playroom," and has a user interface aimed at children. The Playroom hides all the complex operating system commands from the users, however, it is not configurable, and is used only with the applications that are integrated with it. However, many of these home GUI's use cartoon scenes that look artificial and nothing like the objects they are intended to represent. Moreover, these home GUI's are not customizable to an individual user's needs.

The graphical user interface, incorporating graphic images, or icons, that represent applications and data are quickly becoming the most popular computer user interface because of the simplicity and intuitive nature of these graphical user interfaces. However, heretofore, the graphical images of the graphical user interface allowed for very little user customization.

The user needs to have an interface that is easily defined with familiar scenes and objects. User experience and needs vary, creating a wide range of possible interfaces. Current graphical interfaces require the user to associate fixed icons with tasks, which is acceptable to seasoned computer users, but foreign to new users. A user definable interface, proposed by Dan-Dimura et al., "Forum/Formula, A Visual Programming Paradigm For User-Definable User Interfaces," IEEE Computer, 27–35, March, 1995, allows customization but it requires learning a visual language. This would be unacceptable for unsophisticated computer users such as children.

What is needed is a graphical user interface which can make use of any supplied scene (bitmap image) to be used as a graphical user interface. By allowing a user to select an arbitrary image for the graphical user interface, the user can learn the computer interface quickly and easily because objects in the scene would be familiar. Also, by allowing the user to select the graphical user interface scene, the function or data associated with objects in the scene are inherently more intuitive to the user because he has been able to personally customize the user interface. A wide range of users can be satisfied by having a configurable interface based on a picture (bitmap) that is relevant to the particular user. However, the significant problem of identifying major objects in an arbitrary scene must be solved to allow this user customization of the graphical user interface.

SUMMARY OF THE INVENTION

According to the present invention, a graphical user interface in a data processing system that is customizable to any user selected color bitmap image is provided. The interface includes means for importing an arbitrary color bitmap image that is selected by a user into the data processing system, wherein the color bitmap image contains a plurality of major objects; setting the user selected color bitmap image as a scene for the data processing system's graphical user interface; automatically identifying major objects in the scene, wherein a major object is one having a plurality of pixels of a selected characteristic; selecting an identified major object; and assigning a set of data to the selected major object.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
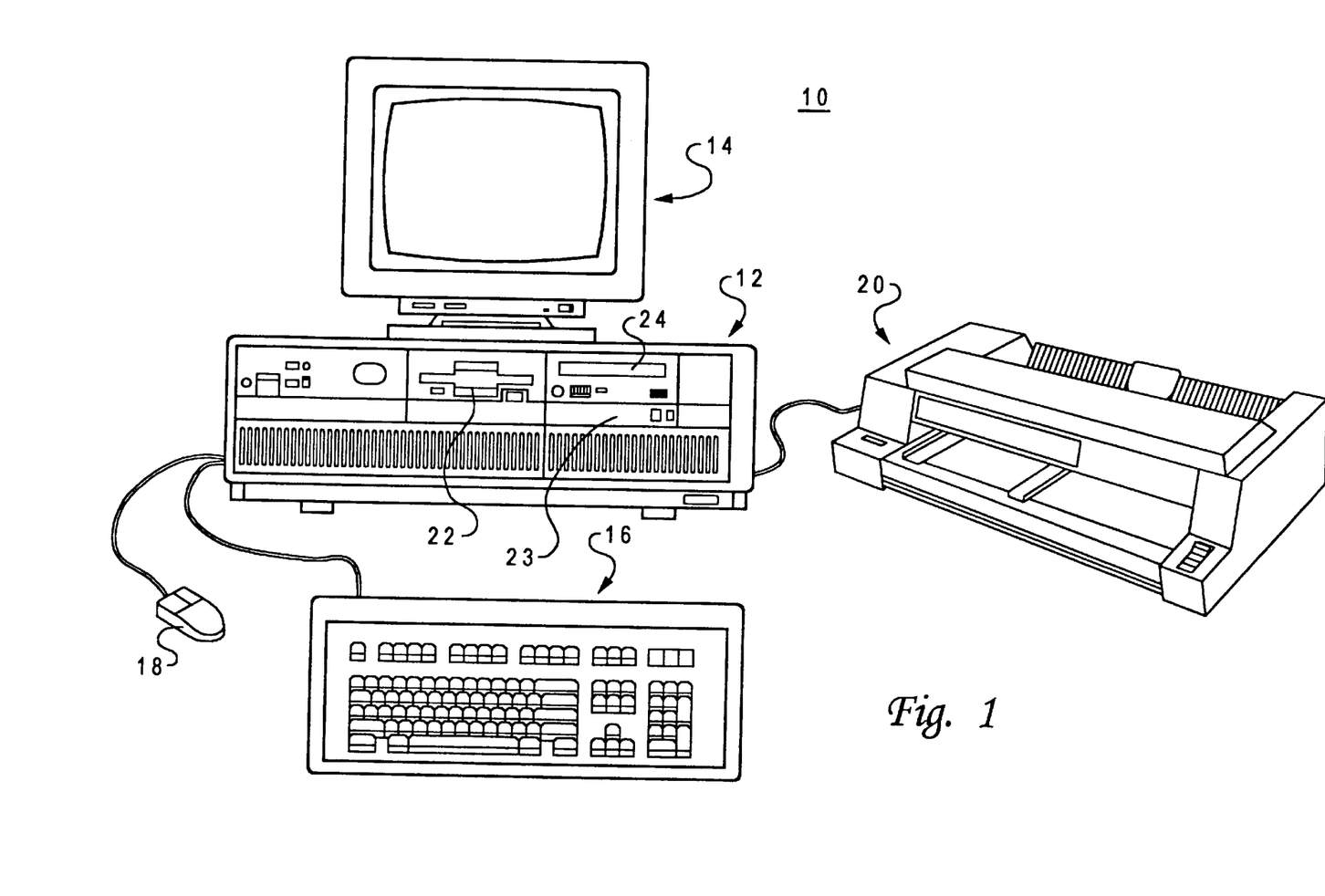
FIG. 1 illustrates a preferred embodiment of a data processing system which may be utilized to implement the present invention.

With reference now to the figures and in particular with reference to FIG. 1, there is illustrated a preferred embodiment of a data processing system which may be utilized to implement the present invention. As illustrated, data processing system 10 includes system unit 12, display device 14, keyboard 16, mouse 18, and printer 20. As is well-known in the art, system unit 12 receives data from input devices such as keyboard 16, mouse 18, or networking/telecommunication interfaces (not illustrated). Mouse 18 is preferably utilized in conjunction with a graphical user interface (GUI) in which system objects, including data processing system components and application programs, may be manipulated by mouse 18 through the selection and movement of associated graphical objects displayed within display device 14. To support storage and retrieval of data, system unit 12 further includes diskette drive 22, hard disk drive 23, and CD-ROM drive 24 all of which are connected to system unit 12 in a well-known manner. Those skilled in the art are aware that other conventional components can also be connected to system unit 12 for interaction therewith.

Figure 2:
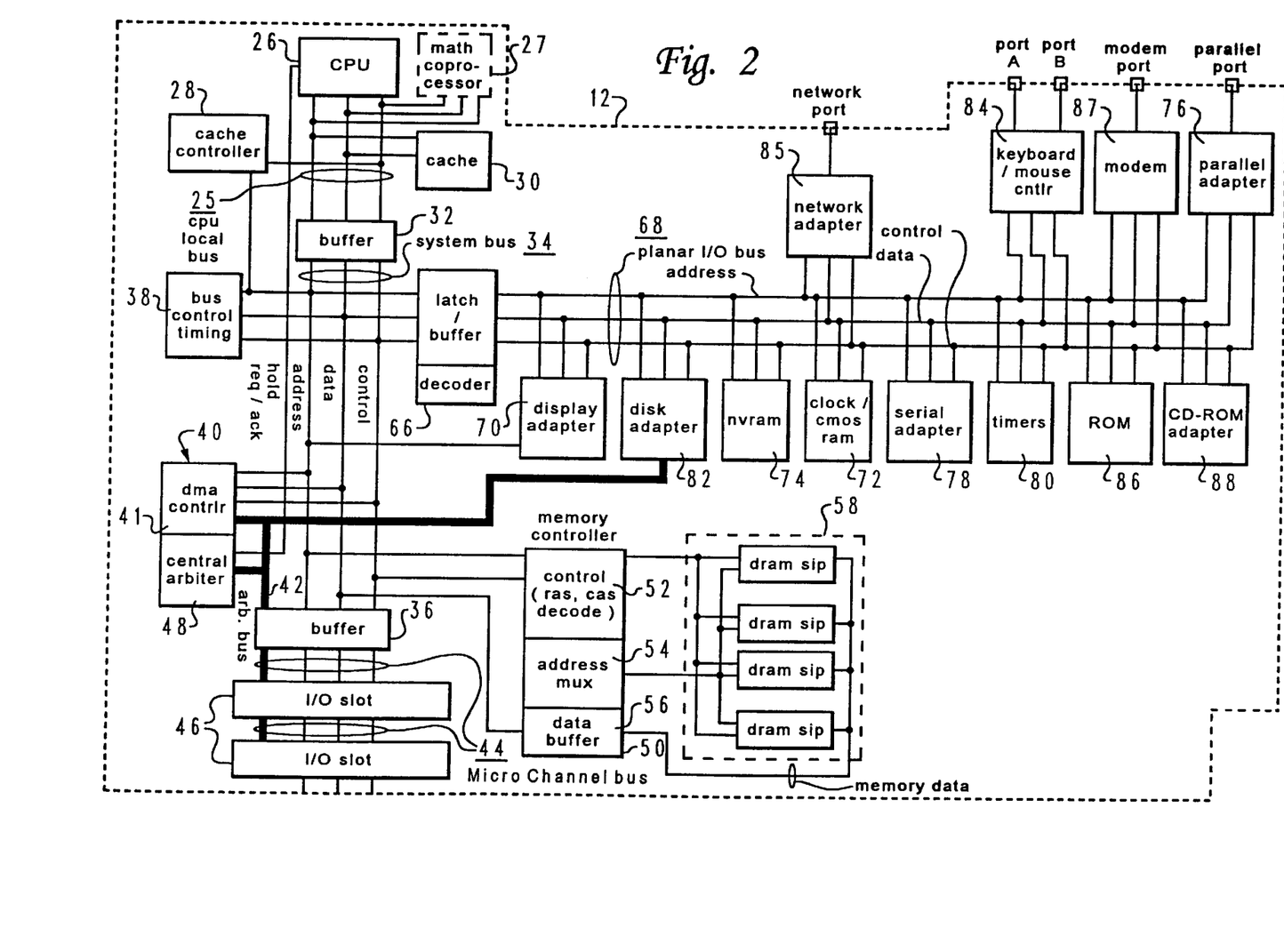
FIG. 2 depicts a block diagram of the principal components of the system unit in the data processing system in accordance with a preferred embodiment of the present invention.

Referring now to FIG. 2, there is depicted a block diagram of the principal components of system unit 12 in data processing system 10. As illustrated, system unit 12 includes a central processing unit (CPU) 26 which executes software instructions. While any appropriate microprocessor can be utilized for CPU 26, CPU 26 is preferably one of the PowerPC™ line of microprocessors available from IBM Microelectronics. Alternatively, CPU 26 could be implemented as one of the 80×86 line of microprocessors, which are available from a number of vendors.

In addition to CPU 26, an optional math coprocessor 27, cache controller 28, and cache memory 30 are coupled to a high-speed CPU local bus 25. Math coprocessor 27 is an optional processor, distinct from CPU 26, that performs numeric calculations with greater efficiency than CPU 26. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to Micro Channel bus 44 by control signals transmitted via arbitration control bus 42.

CPU 26 accesses data and instructions from and stores data to volatile random access memory (RAM) 58 through memory controller 50, which comprises memory control unit 50, address multiplexer 54, and data buffer 56. Memory control unit 52 generates read enable and write enable signals to facilitate storage and retrieval of data and includes address translation facilities that map virtual addresses utilized by CPU 26 into physical addresses within RAM 58. As will be appreciated by those skilled in the art, RAM 58 comprises a number of individual volatile memory modules which store segments of operating system and application software while power is supplied to data processing system 10. The software segments are partitioned into one or more virtual memory pages which each contain a uniform number of virtual memory addresses. When the execution of software requires more pages of virtual memory that can be stored within RAM 58, pages that are not currently needed are swapped with the required pages, which are stored within secondary storage, such as hard disk drive 23, which is controlled by disk adapter 82.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user mode can access only memory allocated to its virtual address space; the user mode program cannot access memory within another process's virtual address space unless memory sharing between the processes is supported and the program has the appropriate privileges for the access.

Still referring to FIG. 2, buffer 36 provides an interface between system bus 34 and an optional feature bus such as Micro Channel bus 44. Connected to Micro Channel bus 44 are a number of I/O slots 46 for receiving Micro Channel adapter cards which may be further connected to an I/O device or memory. Arbitration control bus 42 couples DMA controller 41 and central arbiter 48 to I/O slots 46 and disk adapter 82. By implementing the Micro Channel architecture bus arbitration protocol, central arbiter 48 regulates access to Micro Channel bus 44 by extension cards, controllers, and CPU 26. In addition, central arbiter 44 arbitrates for ownership of Micro Channel bus 44 among the bus masters coupled to Micro Channel bus 44. Bus master support allows multiprocessor configurations of Micro Channel bus 44 to be created by the addition of bus master adapters containing a processor and its support chips.

System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, network adapter 85, keyboard/mouse controller 84, modem 87 and parallel adapter 76. Display adapter 70 translates graphics data from CPU 26 into RGB video signals utilized to drive display device 14. Depending upon the operating system and application software running, the visual output may include text, graphics, animation, and multimedia video. Disk adapter 82 controls the storage of data to and the retrieval of data from hard disk drive 23 and diskette drive 22. Disk adapter 82 handles tasks such as positioning the read/write head and mediating between the drives and CPU 26. Non-volatile RAM 74 stores system configuration data that describes the present configuration of data processing system 10. For example, nonvolatile RAM 74 contains information that describes the capacity of hard disk drive 23 or a diskette placed within diskette drive 22, the type of display device 14, the amount of free RAM 58, and the present system configuration. These data are stored in non-volatile RAM when power is removed from data processing system 10.

Clock 72 is utilized by application programs executed by CPU 26 for time and day calculations. Serial adapter 78 provides a synchronous or asynchronous serial interface with external devices through a serial port (not shown), which enables data processing system 10 to transmit information to/from a serial communication device. Timers 80 comprise multiple interval timers which may be utilized to time a number of events within data processing system 10. As described above, timers 80 are among the devices directly controlled by some application programs, particularly games, which were written for a single-threaded operating system environment.

ROM 86 typically stores a basic input/output system (BIOS) which provides user-transparent I/O operations when CPU 26 is operating under the DOS operating system. BIOS also includes power on self-test (POST) diagnostic routines which perform system set-up at power on. For example, POST interrogates hardware, allocates a BIOS data area (BDA), constructs an interrupt vector table to point to interrupt handling routines within ROM 86, and initializes timers 80, clock 72 and other devices within system unit 12. CD-ROM adapter 88 controls the retrieval of data from CD-ROM drive 24.

Parallel adapter 76 enables system unit 12 to output data in parallel to external devices such as printer 20 through a parallel port. Keyboard/mouse controller 84 interfaces system unit 12 with keyboard 16 and a pointing device, such as mouse 18. Such pointing devices are typically utilized to control an on-screen element, such as a graphical pointer that specifies the location of the pointer when the user presses a mouse button. Other pointing devices include a graphics tablet, stylus, light pen, joystick, puck, trackball, trackpad, and the pointing device sold by IBM under the trademark "TrackPoint".

Finally, system unit 12 includes network adapter 85 and modem 87, which facilitate communication between data processing system 10 and other data processing systems, including computer networks. Network adapter 85 is utilized to connect data processing system 10 to a computer network such as a local area network (LAN) connected to the network port. Computer networks support electronic transmission of data electronically over the network connection. Networks also support distributed processing, which enables data processing system 10 to share a task with other data processing systems linked to the network. Modem 87 provides modulation and demodulation of analog data communicated over a telecommunication line from and to a digital form. For example, a modem may be utilized to connect data processing system 10 to an on-line information service, such as the information service provided by Prodigy Services Corporation under the service mark "PRODIGY". Such on-line service providers offer software and data that can be downloaded into data processing system 10 via the modem. Furthermore, telephone communication through modem 87 provides a connection to other sources of software, such as a server, an electronic bulletin board, and the Internet or "World Wide Web".

As described in detail below, aspects of the present invention pertain to specific methods or functions implementable on computer systems. These aspects of the present invention may be implemented as a computer program product for use with a computer system. Those skilled in the art should readily appreciate that computer programs defining the functions of the present invention can be delivered to a computer in many forms, which include, but are not limited to: (a) information permanently stored on non-writable storage media (e.g. read only memory devices within a computer such as ROM 86 or CD-ROM disks readable by a computer I/O attachment such as CD-ROM drive 24); (b) information alterably stored on writable storage media (e.g., floppy disks within diskette drive 22 or hard disk drive 23); or (c) information conveyed to a computer through communication media, such as through a computer network attached to network adapter 85 or a telecommunication line attached to modem 87. It should be understood, therefore, that such media, when carrying computer readable instructions that direct the method-functions of the present invention, represent alternate embodiments of the present invention.

Figure 3:
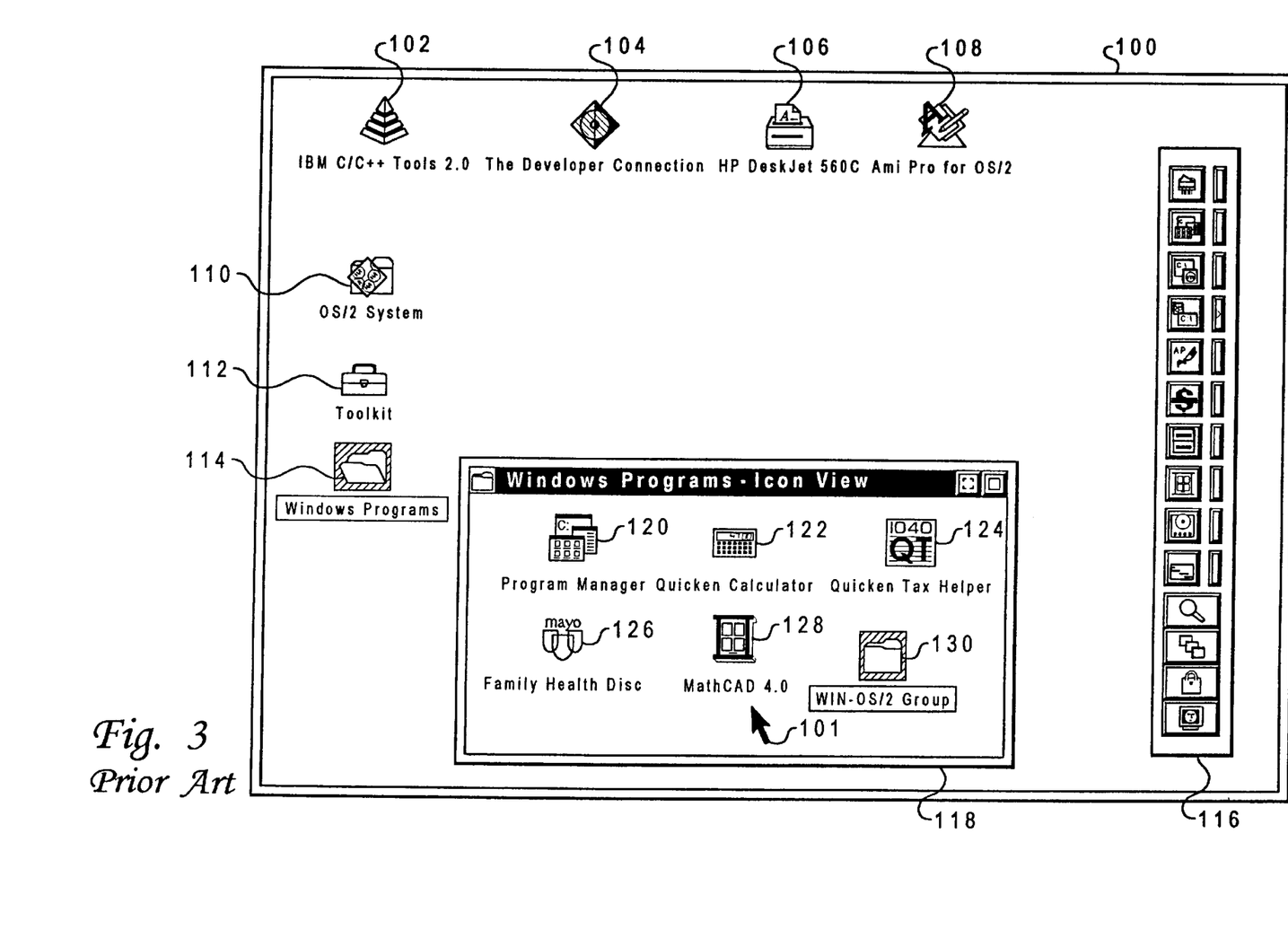
FIG. 3 depicted a standard graphical user interface (GUI) employed by the data processing system's operating system.

Referring now to FIG. 3, there is depicted a standard manufacturer provided graphical user interface (GUI) employed by the data processing system's operating system. Background desktop 100 displayed to a user within display device 14 includes a plurality of user-selectable icons 102–116. Each icon 102–116 represents an application, function or file storage area which a user can conveniently select utilizing graphical pointer 101 by double-clicking the left button of mouse 18. When a user selects one of icons 102–116, the function corresponding to the selected icon is activated and the selected icon is highlighted. Many of icons 102–116 have an associated window or series of windows which are displayed when the icon is selected. For example, as seen in FIG. 3, when Windows Programs icon 114 is selected, window 118 is displayed to the user to provide further possible selections (i.e., icons 120–130).

The present invention allows a user to select an arbitrary bitmap image to be used as the user's computer graphical user interface. The user is allowed to select any arbitrary color bitmap image that is desired. This allows a user to customize the graphical user interface to fit the user's sophistication and intended application for the graphical user interface (GUI). So, for instance, the user could select a picture of his own office, his kitchen, his children's playroom, or some other arbitrary picture of objects, such as a selection of products being sold by a company, for example. Then, according to the present invention, the color bitmap image is automatically analyzed to identify major objects in the arbitrary scene selected by the user. The user or the computer then assigns tasks to each identified object in the scene. In the case of the picture of an office, the present invention would identify books, a clock, a filing cabinet, a phone, etc., and then would assign appropriate tasks to those objects. Thereafter, a user can invoke the function or task or data associated with a particular identified object in the scene by selecting that object with a suitable pointing device, such as a mouse.

It will be appreciated that this user customizable graphical user interface provides a substantial benefit to computer users by allowing them to select their own graphical user interface and not forcing them to learn the user interface provided by applications and operating systems presently available, which may be more difficult and less intuitive to the user. In essence, the present invention allows users to learn a computer interface quickly and easily because the objects presented are familiar. For example, by using a picture of his office, a user can assign a word processing application to a pad of paper, a cd player application to a cd player, and stored files to a filing cabinet. A picture of a kitchen could be used to store data files of recipes. A picture of a child's playroom or their favorite movie could have game applications assigned to various major objects in the scene. A picture of a company's products could be selected as the interface for a computer available to customers in a store, and a multimedia application could be assigned to each product that would be initiated by customer selection of that product.

In still another application, a customizable GUI can also be applied to controlling physical objects that are controlled by a computer. For example, a picture of an answering machine could be selected as the interface. Each of the buttons on the answering machine would be identified as a major object. The user could then assign various controls of a computer answering machine application to the different buttons shown on the user interface.

Figure 4:
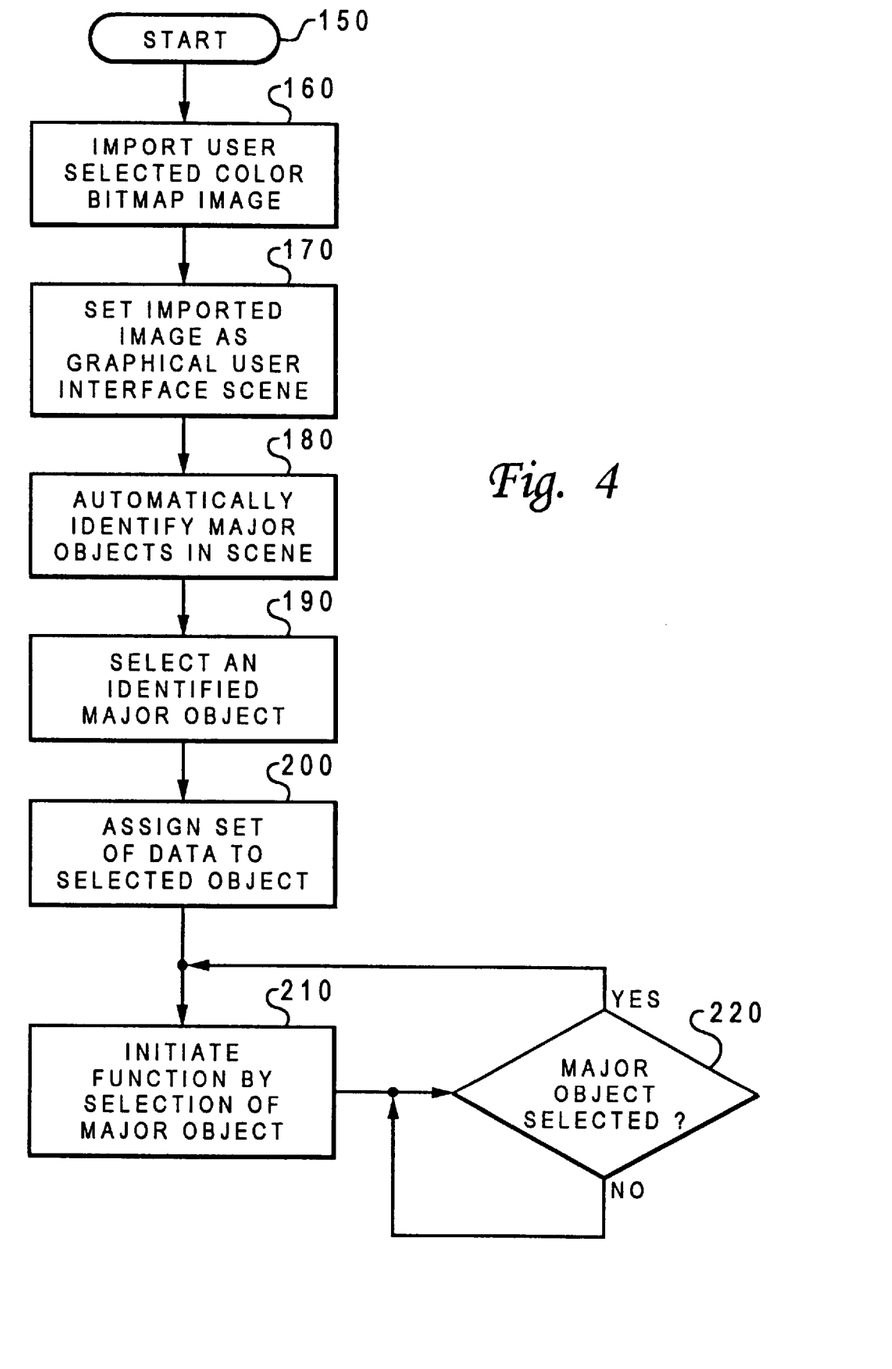
FIG. 4 shows a flow diagram of the method of customizing a graphical user interface in a data processing system to any user selected color bitmap image, in accordance with a preferred embodiment of the present invention.
Figure 5:
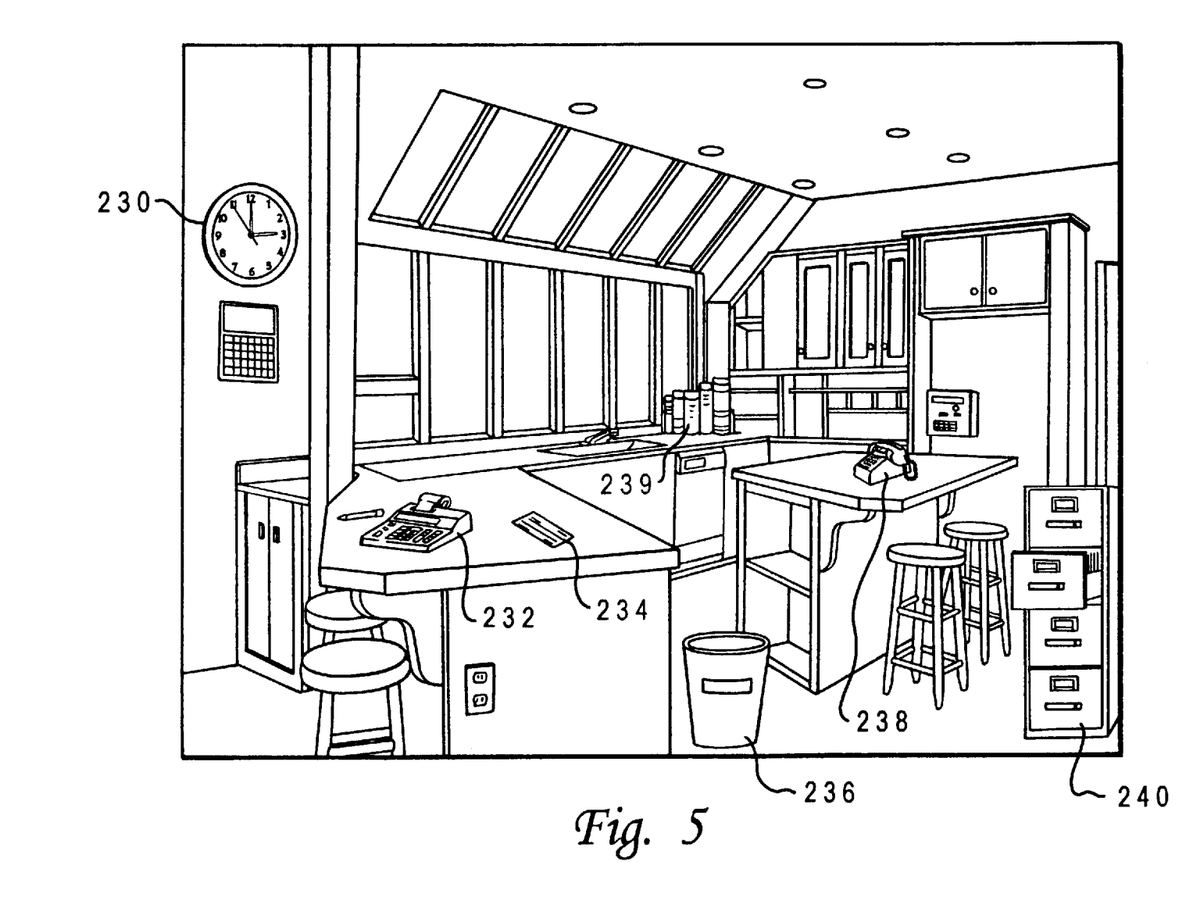
FIG. 5 shows a picture of a kitchen that includes a variety of objects including a clock, a calculator, a checkbook, a telephone, a trash can, and a filing cabinet used with a preferred embodiment of the present invention.

Referring now to FIG. 4, there is shown a flow diagram of the method of customizing a graphical user interface in a data processing system to any user selected color bitmap image, in accordance with a preferred embodiment of the present invention. The process starts at step 150 and proceeds to step 160 where an arbitrary color bitmap image is selected by a user and imported into the computer. The imported bitmap image can be any arbitrary picture. As an example, FIG. 5 shows a picture of a kitchen that includes a variety of objects including a clock, a calculator, a checkbook, a telephone, a trash can, books, and a filing cabinet. A color bitmap image of this kitchen would be imported into the computer by, for example, digitally scanning the picture or photographing the picture with a CCD camera or using other techniques as are well known in the art. Alternatively, the color bitmap image could be imported from a database purchased by the user that contains a large number of color bitmap pictures that may be downloaded into a computer.

Referring back to FIG. 4, the process proceeds to step 170 where the arbitrary, imported, color bitmap image is set as the graphical scene displayed as the graphical user interface for the computer. The process proceeds to step 180 where major objects in the scene are automatically identified by the computer. A major object is an object shown in the selected color bitmap image having a plurality of pixels of a selected characteristic. In accordance with one aspect of the present invention, that selected characteristic is the color displayed by pixels in the bitmap image. Therefore, the present invention automatically identifies major objects in the scene presented by the graphical user interface by identifying objects having groups of pixels that are substantially the same color. This process of identification according to the present invention will be described in detail hereinafter.

The process then proceeds to step 190 where a major object having been identified in the scene is selected. This selection could be performed automatically by the computer based on predefined criteria, or, as is more likely, a major object would be selected by the user with a pointing device such as a mouse. Thus, for example, as seen in FIG. 5, the user might select clock 230, calculator 232, checkbook 234, trash can 236, telephone 238, books 239 or filing cabinet 240. The process then proceeds to step 200 where a set of digital data is assigned to the object selected at step 190. This set of data may be computer instructions or code for performing a function or may be a database containing digital data that is utilized by an application or computer program. So, for example, clock 230 might be assigned to a calendar program, calculator 232 might be assigned to a spreadsheet program, checkbook 234 might be assigned an accounting program, trash can 236 might be assigned to an operating system utility for deleting programs and data, telephone 238 might be assigned telephony applications such as a modem or online-service, books 239 might be assigned to a library database, and filing cabinet 240 might contain a variety of data files that may be utilized by spreadsheet, word processing or drawing applications.

Thereafter, the process may end or, optionally, as shown in FIG. 4, the process proceeds to step 210 where a function defined by the assigned set of data is initiated by selection of the major object in the graphical user interface. At this step, the user selects a major object in the scene that has been assigned an active function (i.e., a set of instructions that execute in the computer to perform a function), which then initiates the function (i.e., executes the code). Thereafter, at decision block 220, the process continuously determines if the major object has been selected. When it is, the process returns to step 210 where the function associated with the selected major object is again initiated.

Enabling this user definable interface with any arbitrary bitmap has one significant technical challenge. The primary objects in the bitmap used to represent data or initiate actions must be isolated. Once isolated, the user can then assign functions to these objects. A possible solution is to require the user to draw an outline around the primary objects, and then associate functions to those objects. Mouse precision, however, is limited. Drawing intricate polygons around the objects is difficult and time consuming, and therefore new users would be intimidated by such methods. Therefore, a method of automatically identifying major objects is used in a preferred embodiment of the present invention.

One well known method for automatically identifying images based on finding edges on grey scale images could be used for the present invention. Computational object identification based on gray scale methods employ four steps:

1. Noise Reduction.
2. Edge Detection.
3. Object Segmentation.
4. Recognition.

Computer vision algorithms analyze every pixel on the screen, and are therefore sensitive to any spurious points (noise). These spurious points need to be filtered out before any image processing calculations are performed. Averaging local pixels, performing statistical methods, or applying the fourier transform to the frequency domain, are some of the noise reduction methods. Using a simple median averaging approach, followed by applying a threshold value to map all grey shades to binary black and white will generally filter well for a grey scale bitmap. Using simple averaging, without the thresholding, requires fewer calculations, but tends to blur the image.

Whereas a grey scale image can be represented by one variable, a color image requires at least three variables (typically red, green, and blue). Therefore, the color image is more susceptible to noise, and more difficult to filter. The selective median filtering technique will reduce the noise as well as maintaining the image sharpness, but a threshold must be determined empirically, or statistically, for each type of image being analyzed. Although this approach is quite complex, and is very image specific, it has application in inspection robots for an assembly line.

The process of separating the objects from the background is know as segmentation. Many segmentation methods have been developed, and can be classified as either being an edge-based method or a region based method. The edge method defines the shape of an object by the rapid transition from one brightness to another. The region method groups objects based on similar pixel characteristics, either through spatial proximity or intensity.

Edge detection is used to find the boundaries of the objects. Most edge detection methods are gradient based approaches. Determining the gradient of the object is most commonly found with an edge operator that approximates the mathematical gradient operator such as the Sober operator for first order differential and the Laplacian for an approximation to the second order derivative. The second derivative Laplacian provides better edge detection, but sensitive to noise. Once the gradients are determined a threshold is applied to determine which are "real" edges. If the threshold value is too high, gaps will appear in the boundary and if too low, the boundary may be distorted by spurious values. Once the thresholding is done the missing points on the boundaries must be filled in to define a closed boundary for the object. One method, the Hough transform, is a popular method that describes the boundary as a parametric curve. Color adds another dimension to the problem and the gradients must be computed for the color axes and not just the intensities.

Rather than finding the edge boundaries and claiming all that is inside belongs to a particular object, region based segmentation classifies pixels based on common characteristics and spatial proximity. Region-based segmentation can be broadly classified into three major areas: Histogram based, whereby pixels with similar color/hue characteristics belong to the same object. Neighborhood-based includes probability of pixels close by to be part of the same object. Physically-based methods use information about the color intensity and spatial-frequency features to find common pixels. Seed based region growing is a popular method that combines histogram and region-based. To identify an object an initial seed point is provided and the algorithm finds pixels with similar properties, within a distance tolerance.

After an initial segmentation into objects is complete, a series of split and merge operations can be performed to reduce the number of objects identified. These methods are based on techniques that consider spatial location, shape, intensity, and probability distributions. One method determines the gradient magnitude for all the pixels in the image. The gradient magnitude is determined by using the horizontal and vertical Sober operators:

$$Sx(x,y) = \begin{matrix} -1 & 0 & 1 \\ -2 & 0 & 2 \\ -1 & 0 & 1 \end{matrix}$$

and $$Sy(x,y) = \begin{matrix} -1 & -2 & -1 \\ 0 & 0 & 0 \\ 0 & 2 & 1 \end{matrix}$$

The gradient for each r,g,b is determined by
$ga(x,y)=|[Sx*r](x,y)|+|[Sy*r](x,y)|$ where * denotes convolution and a is r,g or b;
the total gradient for the pixel is $$G(x,y)=gr(x,y)+gg(x,y)+gb(x,y)$$

The resulting image is then binary thresholded, i.e. any value of G=>Threshold will be represented by a white dot and any value < will be black. The resulting image should display the edges of the objects which can then be categorized into regions.

The traditional edge detection methods are compute intensive, very sensitive to the choice of the threshold, and have difficulty determining the actual center of an edge. Further, these techniques are very sensitive to noise, require substantial calculation, and also need methods for connecting and completing missing edges before segmentation is done. Most of these compute intensive activities seem quite easy for humans and therein a potential application for neural networks. Neural networks have great potential in this area since they are developed to follow the same approach as biological visual systems in mammals. The method, however, does require a fairly complex neural net and a good amount of training.

Most computer vision requires precise identification of object edges such as needed for automated placement of parts in an assembly line, inspection of parts (comparison and identify known objects), and military applications. For the present invention, only the general shape of large objects in the bitmap need be identified. Comparisons to other objects are not being made, so exact boundary detection is not necessary.

Gradient thresholding could be accomplished using convolution of the bitmap with the Sober operators described previously. Once the convolution is complete, thresholding with varying values for R, G, B thresholds can be accomplished and the resulting binary bitmap is displayed. However, the convolution method is not an acceptable method for this application since it requires a significant amount of computer time, and the tolerance cannot be determined without user intervention. Further, using the boundaries, denoted by the edges, would be no better than simply assigning any objects based on RGB values and proximity. Therefore, an alternative method of object identification is proposed.

The method of the present invention identifies objects in the imported color bitmap image by the following general steps. Move from left to right, colors within a particular tolerance are part of the same object, once a color, outside the tolerance is found, a new object is defined. Once horizontal comparisons are made, continue with vertical comparisons. Each time a color is found to be within the tolerance, it takes on the value of the previous point. When complete, all points that are part of the same object will have the same color. This method can be described in an algorithm of the present invention in pseudo-code as the following four steps:

1. Transform all value to color space of interest (RGB, YIQ, HSB)
2. Scan Left to Right
    Start at Top Row: Row
      Start at Leftmost Column: Col.
        Is |RGB(Row,Col.) – RGB(Row,Col. + 1)| <= Tolerance?
            (or within a range of colors)
          yes: RGB(Row,Col. + 1) = RGB(Row,Col.);
          no: No change to RGB
        Increment Col. and continue until Col. = Max. Rightmost Col. – 1
      Increment Row and continue until Row = Maximum Row
3. Scan Top to Bottom
    Start at Leftmost Column: Col.
      Start at Top Row: Row
        Is |RGB(Row,Col.)– RGB(Row + 1,Col.)| <= Tolerance?
          yes: RGB(Row + 1,Col.) = RGB(Row,Col.);
          no: No change to RGB
        Increment Row and continue until Row = Maximum Row – 1
      Increment Col. and continue until Col. = Maximum Rightmost Col.

4. Display Results

The solution of object identification herein makes the following assumptions:

1. The color values associated with the pixels within an object will be grouped within a small range. For example: the R,G,B values for all the pixels within an object will be within some percentage (e.g. 10%) of each other.

2. If the R,G,B values are not within a particular range, there exists a color transformation that will group the pixels to the range.

3. Objects of similar color groups will not be next to each other.

A scene is represented by a bitmap in vector graphics array format of 640 by 480 pixels. Each pixel is represented by a 24 bit number comprised of 3 bytes, the first byte represents blue, the second green, and the third represents red. In this algorithm, the entire range of each axis is represented by a scale of 512 values. The 512 values are represented by RGB values associated with the axis value. A value of zero is represented by deep blue, a value of 512 by bright red, and a mixture is used for the values in between. This visual representation of each axis allows quick visualization of how well a particular color transformation will work for picking an object. Noise reduction is performed by taking each 4×3 block of pixels, calculating the average RGB (or appropriate translated color space), and assigning those values to all the pixels in that block.

To further enhance the identifying function of the present invention, the process can optionally map the color bitmap image to a more desirable color space. Three potential color mappings are:

1. The spectral primary system (RGB).
2. The hue saturation and intensity system (HSI).
3. The NTSC transmission system (YIQ).

The RGB system is based on the three primary colors perceived by humans, red, green, and blue. Most camera and displays are designed to work with these colors. Prior art has shown that this color space is not optimal for object segmentation. But previous methods were based on gradient based identification methods. The present invention shows that the RGB color space provides satisfactory results, and in some cases preferred results, when segmentation is performed by the method of the present invention.

The HSI system is supposed to be the best perceived by humans. H stands for the Hue and is essentially a measure of the wavelength of the primary color for the pixel. It is mapped to a angle where red is zero degrees, green is 120 degrees, and blue is 240 degrees. S stands for saturation is the amount of pure hue in the final color. If the saturation is at the minimum (zero) then there is no hue and the color is white, if the saturation is maximum (255) then there is not white light added to the final color. I is the intensity, and it represents the intensity of the brightest component. It's transformation from RGB is as follows:

I=(R+G+B)/3;

S=1-[min(R,G,B)/I];

H=1/360[90-atan(F/sqrt(3))+{0,G>B;180,G<B}];

where F=(2R-G-B)/(G-B);

The NTSC (National Television Standard Committee) color standard used in the United States uses the YIQ system. I, which stands for In Phase, maps orange/cyan, and Q (Quadrature) maps magenta/green. These groups were chosen since the eye-brain system has limited ability to resolve magenta and green details compared to those with orange and cyan. The transformation to the YIQ space is a linear transformation of the RGB values:

---

Y = 0.299R + 0.087G + 0.114B
I = 0.596R − 0.274G − 0.322B
Q = 0.211R − 0.523G − 0.312B

---

It should be noted that although these transformations are quite straightforward, significantly more storage than the RGB mapping is required since each pixel (640×480 pixels per bitmap) requires more storage to allow for fractions and to reduce round-off errors.

The imported color bitmap image is in 256 colors and is mapped to the full 256 R, 256 G, and 256 B range. The values are non-uniformly distributed due to the mapping from 256 color combinations of RGB to the full 256 variations for each R,G, and B. The objective is to apply tolerance values during the mapping of the imported color bitmap image such that the objects of interest have one primary color for the entire object. In a preferred embodiment, the tolerance values for the RGB colors are R=35, G=35, R=35. Mapping the imported color bitmap image to the YIQ color space more evenly distributes the intensity values. In a preferred embodiment, the tolerance values for the YIQ color space are Y=100, I=100, Q=25. Mapping the imported color bitmap image to the HSI color space provides further enhancement of the color distribution. In a preferred embodiment, the tolerance values for the HSI color space are H=100, S=255, I=25.

Figure 6:
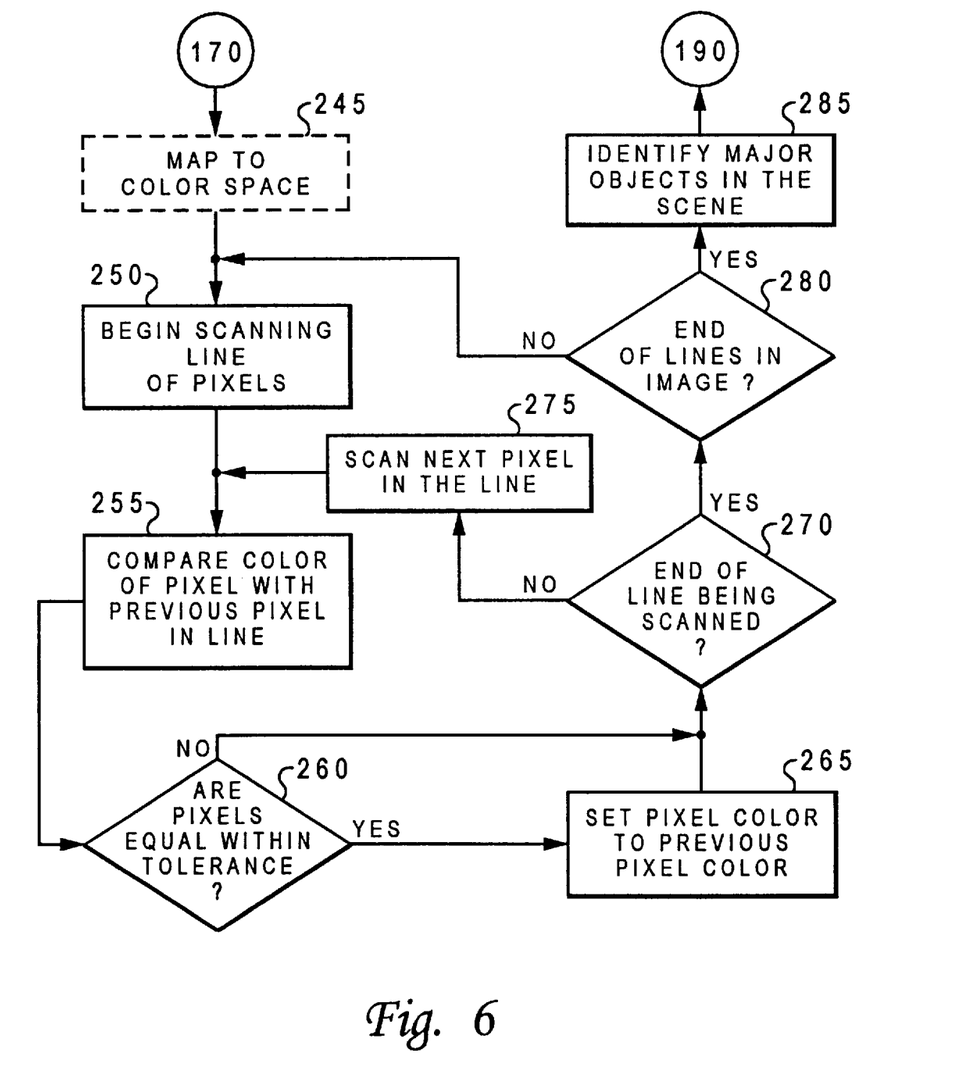
FIG. 6 shows a flow diagram of a method for automatically identifying major objects in a scene, in accordance with the preferred embodiment of the present invention.

Referring now to FIG. 6, there is shown a flow diagram of a method for automatically identifying major objects in a scene, in accordance with the preferred embodiment of the present invention. The process shown in FIG. 6 performs the function described at step 180 in FIG. 4. Thus, the process continues from step 170 to step 250 where the first line of pixels in the image is scanned. However, in an alternative preferred embodiment of the present invention, the step 250 may be preceded by the step of mapping the color bitmap image to a color space desired, as shown at step 245, and as has been described hereinabove. At step 250, the scan begins at the second pixel of the line where the color of that pixel is compared with the color of the previous pixel in the line, as shown at step 255. At decision block 260, it is determined whether the comparison shows the pixel to be equal to the previous pixel within a predetermined tolerance. This predetermined tolerance can be expressed as some percentage of the various color values for each pixel. The particular preferred tolerances for three preferred color spaces are described hereinabove.

If the colors of the two pixels compared are shown to be equal to within the predetermined tolerance, the decision at decision block 260 is affirmative and the process proceeds to step 265 where the color of the pixel is set to the color of the previous pixel. After step 265, or if the decision at decision block 260 is negative, the process proceeds to decision block 270 where it is determined whether the end of the line has been reached. If not all the pixels in the line have been scanned, the process proceeds to step 275 where the next pixel in the line is scanned and the color of that pixel is compared with the previous pixel in the line at step 255. If all the pixels in the line have been scanned and the end of the line has been reached, the process proceeds from decision block 270 to decision block 280 where it is determined whether all lines of the color bitmap image have been scanned. If they have not, the process proceeds to step 250 where scanning begins on the next line of pixels in the image. If the end of the lines in the image have been reached and all lines have been scanned, the process proceeds from decision block 280 to step 285, where the process then identifies each major object in the scene as being a group of adjacent pixels in the scanned image having the same color. The size of the group of chromatic adjacent pixels that defines a major object can be set to any particular value depending on the desired granularity for detecting major objects within the graphical user interface. The process proceeds from decision block 285 to step 190 shown in FIG. 4

As will be appreciated by those skilled in the art, the process has moved from left to right across the image, defining colors within a particular tolerance as part of the same object. Once a color outside the tolerance is found, a new object is defined. Thus, each time a color is found to be within the tolerance, its pixel takes on the value of the previous point. It will be appreciated that once complete, all points that are part of the same object will have the same color. As will be further appreciated by those skilled in the art, the resolution and contrast of major objects can further be facilitated by scanning columns of the horizontally scanned image. It will be appreciated that the method as shown in FIG. 6 describes scanning horizontal lines of the color bitmap image, and that the same process can be performed by scanning vertical columns of the color bitmap image in conformity with the process of FIG. 6.

Figure 7:
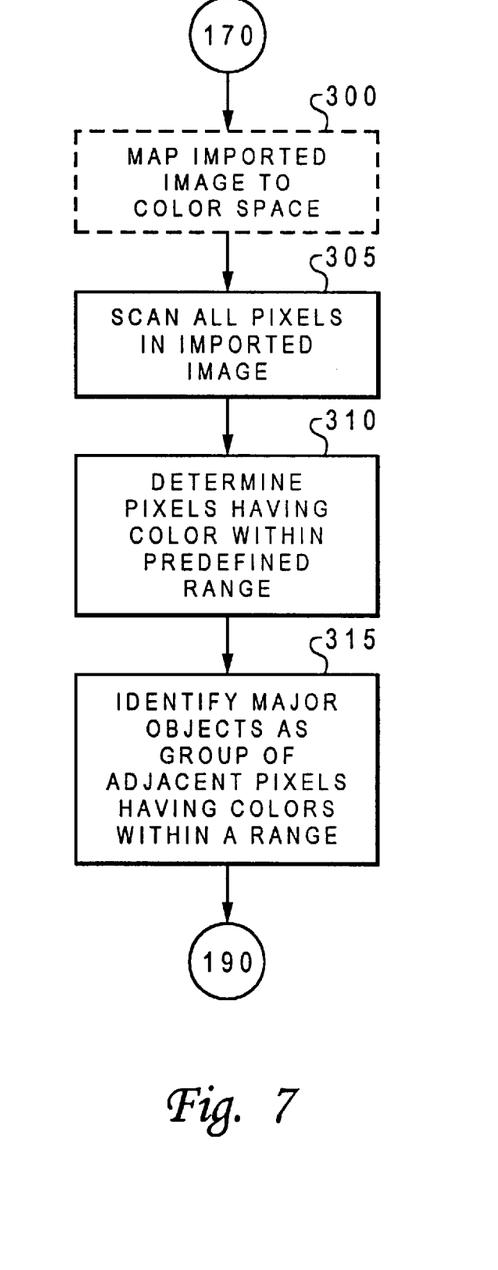
FIG. 7 shows a flow diagram of an alternative process for automatically identifying major objects in the scene, in accordance with an alternative preferred embodiment of the present invention.

Referring now to FIG. 7, there is shown a flow diagram of an alternative process for automatically identifying major objects in the scene, in accordance with an alternative preferred embodiment of the present invention. This process performs the step of automatically identifying major objects in the scene as shown at step 180 of FIG. 4. Thus, the process proceeds from step 170 to the optional step 300 of mapping the color bitmap image to a desired color space. The desired color space would be the preferred color space for identifying major objects within a particular type of scene. The desirability of performing this step or the selection of the preferred color space is application specific and may vary depending upon the user's needs.

Thus, the process proceeds from step 170, or optionally from step 300, to step 305. All pixels of the image are scanned to determine the color value of each pixel in the image at step 305. At step 310, all pixels within the image are grouped with pixels in the image that all have a color within a predefined range of colors within the spectrum of colors allowed within the image. This range of colors could be defined based upon knowledge of certain colors of objects within the image. For example, if telephone 238 were the only red object in the image of FIG. 5, a predefined range within the color red could be compared with the pixels of the image. Thereafter, as shown at step 315, a major object within the image can be identified as a group of adjacent pixels having pixel colors within the predefined range of colors in the spectrum of colors. Thereafter, the process proceeds to step 190 shown in FIG. 4.

In an alternative preferred embodiment, the predefined range of colors can be selected by the user. The user would use a pointing device such as a mouse to place a graphic pointer on top of a major object within the scene to be identified. The program would then define the range of colors that include the color of one or more pixels directly under the graphic pointer. Thus, for example, the user would indicate with a mouse a particular object in the scene, such as the telephone, and the process at step 310 would determine what pixels within the scene are within the range of colors defined between two colors that are a small percentage difference from the indicated pixels.

In summary, the present invention provides a graphical user interface in a data processing system that is customizable to any user selected color bitmap image. The interface includes means for importing an arbitrary color bitmap image that is selected by a user into the data processing system, wherein the color bitmap image contains a plurality of major objects; setting the user selected color bitmap image as a scene for the data processing system's graphical user interface; automatically identifying major objects in the scene, wherein a major object is one having a plurality of pixels of a selected characteristic; selecting an identified major object; and assigning a set of data to the selected major object. In this way, the present invention provides a graphical user interface which can make use of any bitmap image imported into the computer by the user as a graphical user interface. By allowing a user to select an arbitrary image for the graphical user interface, the present invention allows the user to learn the computer interface quickly and easily because objects in the scene are familiar. Also, by allowing the user to select the graphical user interface scene, the function or data associated with objects in the scene are inherently more intuitive to the user because he has been able to personally customize the user interface. In this way, a wide range of users can be satisfied in utilizing the present invention by having a configurable interface based on a picture (bitmap) that is relevant to the particular user.

While the invention has been particularly shown and described with reference to a preferred embodiment, it will be understood by those skilled in the art that various changes in form and detail may be made therein without departing from the spirit and scope of the invention.

What is claimed is:

1. A method of customizing a graphical user interface in a data processing system to any user-selected color bitmap image, the method comprising the steps of:

importing into the data processing system a user-selected color bitmap image, wherein the color bitmap image is comprised of a plurality of pixels and contains a plurality of major objects;

setting the user-selected color bitmap image as a scene for the graphical user interface of the data processing system;

automatically identifying major objects in the scene said step of automatically identifying including:

scanning a line of pixels in the imported color bitmap image and, at each current pixel in said line of pixels, comparing a color of the current pixel with a color of a previous pixel scanned;

if the color of the current pixel is within a predetermined tolerance of the color of the previous pixel, setting the color of the current pixel to the color of the previous pixel; and repeating said steps of scanning a line of pixels and setting the color of the current pixel for each of a plurality of lines of pixels within said imported color bitmap image, wherein a major object is identified as a group of adjacent pixels in the contrast image having the same color;

selecting an identified major object; and associating a set of data with the selected major object such that said selected major object visually represents said set of data and such that upon subsequent selection of the selected major object alone, the data processing system automatically performs a particular operation utilizing the associated set of data.

2. A method of customizing a graphical user interface in a data processing system to any user selected color bitmap image, according to claim 1, further comprising the step of mapping the imported color bitmap image to a predetermined color space such that the mapped color bitmap image is scanned.

3. A method of customizing a graphical user interface in a data processing system to any user selected color bitmap image, according to claim 2, wherein the step of mapping the imported color bitmap image comprises mapping to color space defined by the spectral primary system.

4. A method of customizing a graphical user interface in a data processing system to any user selected color bitmap image, according to claim 3, wherein the predetermined tolerance is set within a range of 35<R<100, 10<G<50, 35<B<100, from a possible 256.

5. A method of customizing a graphical user interface in a data processing system to any user selected color bitmap image, according to claim 2, wherein the step of mapping the imported color bitmap image comprises mapping to color space defined by the hue saturation and intensity system.

6. A method of customizing a graphical user interface in a data processing system to any user selected color bitmap image, according to claim 5, wherein the predetermined tolerance is set within a range of 1<H<100, 1<S<255, 25<I<255, from a possible 256.

7. A method of customizing a graphical user interface in a data processing system to any user selected color bitmap image, according to claim 2, wherein the step of mapping the imported color bitmap image comprises mapping to color space defined by the NTSC transmission system.

8. A method of customizing a graphical user interface in a data processing system to any user selected color bitmap image, according to claim 7, wherein the predetermined tolerance is set within a range of 50<Y<100, 50<I<100, 10<Q <25, from a possible 256.

9. A method of customizing a graphical user interface in a data processing system to any user selected color bitmap image, according to claim 1, wherein the major objects are identified in part by a user indicating the location of the major objects in the imported color bitmap image.

10. A method of customizing a graphical user interface in a data processing system to any user selected color bitmap image, according to claim 1, wherein the set of data includes software instructions, wherein said step of automatically performing said particular operation comprises the step of automatically executing said software instructions to perform the particular operation whenever the selected major object is thereafter selected.

11. A method of customizing a graphical user interface in a data processing system to any user selected color bitmap image, according to claim 1, said step of scanning a line of pixels in the imported color bitmap image comprising the step of scanning said imported color bitmap image in at least two directions.

12. A graphical user interface for a data processing system, wherein said graphical user interface is customizable to any user-selected color bitmap image and comprises:
    means for importing into the data processing system a user-selected color bitmap image, wherein the color bitmap image is comprised of a plurality of pixels and contains a plurality of major objects;
    means for setting the imported color bitmap image as a scene for the graphical user interface;
    means for automatically identifying major objects in the scene, said means for automatically identifying including:
        means for scanning a plurality of lines of pixels in the imported color bitmap image and for comparing a color of each current pixel with a color of a previous pixel scanned; and
        means for setting the color of the current pixel to the color of the previous pixel if the color of the current pixel is within a predetermined tolerance of the color of the previous pixel, wherein a major object is identified as a group of adjacent pixels in the contrast image having the same color;
    means for selecting an identified major object; and
    means for associating a set of data with the selected major object such that said selected major object visually represents said set of data and such that upon subsequent selection of the selected major object alone, the data processing system automatically performs a particular operation utilizing the associated set of data.

13. A graphical user interface in a data processing system that is customizable to any user selected color bitmap image, according to claim 12, further comprising means for mapping the imported color bitmap image to a predetermined color space such that the mapped color bitmap image is scanned.

14. A graphical user interface in a data processing system that is customizable to any user selected color bitmap image, according to claim 13, wherein the means for mapping the imported color bitmap image comprises means for mapping to color space defined by the spectral primary system.

15. A graphical user interface in a data processing system that is customizable to any user selected color bitmap image, according to claim 14, wherein the predetermined tolerance is set within a range of 35<R<100, 10<G<50, 35<B<100, from a possible 256.

16. A graphical user interface in a data processing system that is customizable to any user selected color bitmap image, according to claim 13, wherein the means for mapping the imported color bitmap image comprises means for mapping to color space defined by the hue saturation and intensity system.

17. A graphical user interface in a data processing system that is customizable to any user selected color bitmap image, according to claim 16, wherein the predetermined tolerance is set within a range of 1<H<100, 1<S<255, 25<I<255, from a possible 256.

18. A graphical user interface in a data processing system that is customizable to any user selected color bitmap image, according to claim 13, wherein the means for mapping the imported color bitmap image comprises means for mapping to color space defined by the NTSC transmission system.

19. A graphical user interface in a data processing system that is customizable to any user selected color bitmap image, according to claim 18, wherein the predetermined tolerance is set within a range of 50<Y<100, 50<I<100, 10<Q<25, from a possible 256.

20. A graphical user interface in a data processing system that is customizable to any user selected color bitmap image, according to claim 12, wherein the means for identifying identifies major objects in part by a user indicating the location of the major objects in the imported color bitmap image.

21. A graphical user interface in a data processing system that is customizable to any user selected color bitmap image, according to claim 12, wherein the set of data includes software instructions, said means for automatically performing comprising means for automatically executing said software instructions to perform said particular operation whenever the selected major object is thereafter selected.

22. A graphical user interface in a data processing system that is customizable to any user selected color bitmap image, according to claim 12, said means for scanning a line of pixels in the imported color bitmap image comprising means for scanning said imported color bitmap image in at least two directions.

23. A computer program product for customizing any user selected color bitmap image for a graphical user interface in a data processing system, said computer program product comprising:

a computer usable medium having computer readable program code means embodied in the medium for customizing any user selected color bitmap image for a graphical user interface, the computer readable program code means including:

computer readable program code means for importing a user-selected color bitmap image into the data processing system, wherein the color bitmap image is comprised of a plurality of pixels and contains a plurality of major objects;

computer readable program code means for setting the imported color bitmap image as a scene for the graphical user interface of the data processing system;

computer readable program code means for automatically identifying major objects in the scene, said computer readable program code means for automatically identifying including:

computer readable program code means for scanning a plurality of lines of pixels in the imported color bitmap image and for comparing a color of each current pixel with a color of a previous pixel scanned; and             computer readable program code means for setting the color of the current pixel to the color of the previous pixel if the color of the current pixel is within a predetermined tolerance of the color of the previous pixel, wherein a major object is identified as a group of adjacent pixels in the contrast image having the same color;

computer readable program code means for selecting an identified major object; and         computer readable program code means for associating a set of data with the selected major object such that said selected major object visually represents said set of data and such that upon subsequent selection of the selected major object alone, the data processing system automatically performs a particular operation utilizing the associated set of data.

24. A computer program product for customizing any user selected color bitmap image user selected color bitmap image, according to claim 23, and further comprising computer readable program code means for mapping the imported color bitmap image to a predetermined color space such that the mapped color bitmap image is scanned.

25. A computer program product for customizing any user selected color bitmap image user selected color bitmap image, according to claim 24, wherein the computer readable program code means for mapping the imported color bitmap image comprises computer readable program code means for mapping to color space defined by the spectral primary system.

26. A computer program product for customizing any user selected color bitmap image user selected color bitmap image, according to claim 25, wherein the predetermined tolerance is set within a range of 35<R<100, 10<G<50, 35<B<100, from a possible 256.

27. A computer program product for customizing any user selected color bitmap image user selected color bitmap image, according to claim 24, wherein the computer readable program code means for mapping the imported color bitmap image comprises computer readable program code means for mapping to color space defined by the hue saturation and intensity system.

28. A computer program product for customizing any user selected color bitmap image user selected color bitmap image, according to claim 27, wherein the predetermined tolerance is set within a range of 1<H<100, 1 <S<255, 25<I<255, from a possible 256.

29. A computer program product for customizing any user selected color bitmap image user selected color bitmap image, according to claim 24, wherein the computer readable program code means for mapping the imported color bitmap image comprises computer readable program code means for mapping to color space defined by the NTSC transmission system.

30. A computer program product for customizing any user selected color bitmap image user selected color bitmap image, according to claim 29, wherein the predetermined tolerance is set within a range of 50<Y<100, 50<I<100, 10<Q<25, from a possible 256.

31. A computer program product for customizing any user selected color bitmap image user selected color bitmap image, according to claim 23, wherein the computer readable program code means for identifying identifies major objects in part by a user indicating the location of the major objects in the imported color bitmap image.

32. A computer program product for customizing any user selected color bitmap image user selected color bitmap image, according to claim 23, wherein the set of data includes software instructions, said computer readable program code means comprising computer readable program code means for automatically performing the particular operation whenever the selected major object is thereafter selected.

33. A computer program product for customizing any user selected color bitmap image user selected color bitmap image, according to claim 23, said means for scanning a line of pixels in the imported color bitmap image comprising means for scanning said imported color bitmap image in at least two directions.

34. A method of customizing a graphical user interface in a data processing system to any user selected color bitmap image, according to claim 11, wherein a first and a second of said at least two directions are orthogonal.

35. A graphical user interface in a data processing system that is customizable to any user selected color bitmap image, according to claim 22, wherein a first and a second of said at least two directions are orthogonal.

36. A computer program product for customizing any user selected color bitmap image user selected color bitmap image, according to claim 33, wherein a first and a second of said at least two directions are orthogonal.

\* \* \* \* \*

UNITED STATES PATENT AND TRADEMARK OFFICE
CERTIFICATE OF CORRECTION

PATENT NO. : 5,874,966
DATED : February 23, 1999
INVENTOR(S) : Polimeni et al.

It is certified that error appears in the above-identified patent and that said Letters Patent is hereby corrected as shown below:

On Col. 9, Line 16, following "but" please insert -- is --.

On Col. 10, Line 1, please delete "compute" and replace with -- computationally--.

On Col. 10, Line 35, delete "Move" and replace with -- While scanning--

On Col. 10, Line 36, after "are" insert --assumed to be-- , after "object" insert --;-- and after "color" delete --,-- and insert after "outside" with a --,--

On Col. 10, Line 37, delete --the tolerance is found, a new object is defined--.

Signed and Sealed this

Thirtieth Day of November, 1999

Attest:

Attesting Officer

Q. TODD DICKINSON

Acting Commissioner of Patents and Trademarks